Sept. 10, 1929.   E. W. ROTH   1,727,785
FLOATING PRESSURE AND VACUUM RELIEF VALVE
Filed May 9, 1928
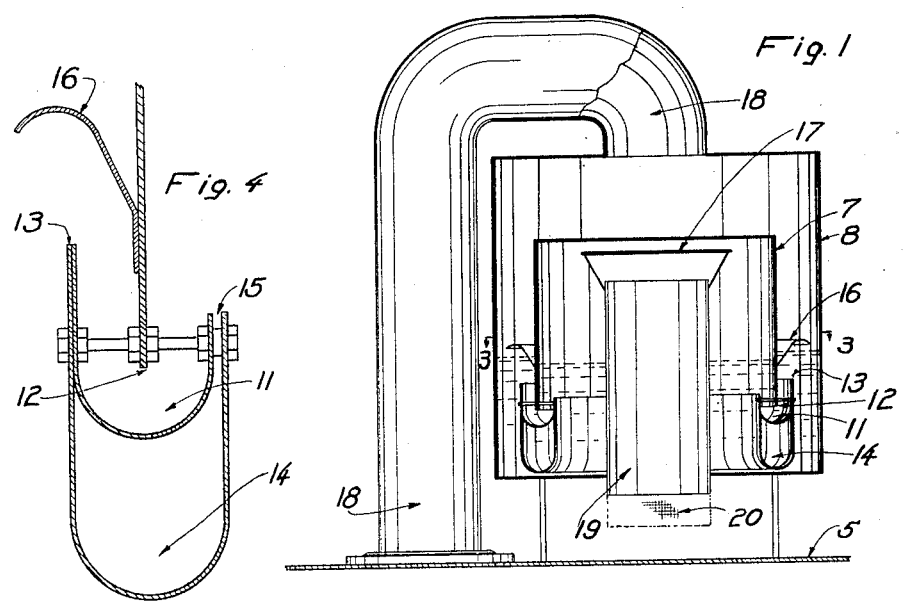
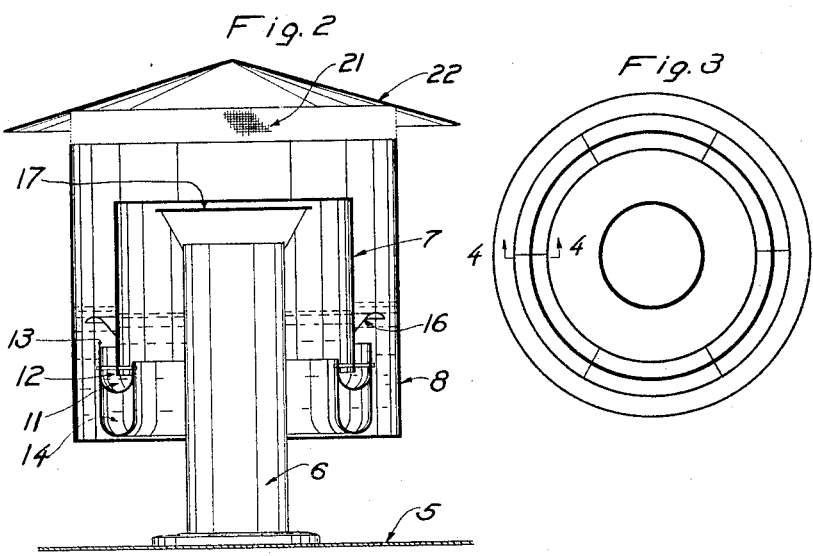
ERNEST W. ROTH
INVENTOR.
BY *Paul W. Bridgman*
ATTORNEYS.

Patented Sept. 10, 1929.

1,727,785

UNITED STATES PATENT OFFICE.

ERNEST W. ROTH, OF LOS ANGELES, CALIFORNIA, ASSIGNOR TO GENERAL PETROLEUM CORPORATION OF CALIFORNIA, OF LOS ANGELES, CALIFORNIA, A CORPORATION OF DELAWARE.

FLOATING PRESSURE AND VACUUM RELIEF VALVE.

Application filed May 9, 1928. Serial No. 276,290.

My invention relates to the art of controlling very low gas pressures in which pressure changes of small moment occur.

My invention relates especially to oil storage tank vents.

In the storage of volatile liquids, such as gasoline, an appreciable saving is effected by the use of a vent which does not permit the tank to freely breathe. By building up a small pressure in the tank the evaporation loss is materially reduced. The pressure which the usual storage tank will stand is, however, very small and the volume of gas is large, a combination of conditions which requires a valve of extreme sensitiveness and large capacity. The pressure range in such a tank is about one inch of positive water pressure to one inch negative. The parts of any valve which is to operate at these low pressure differences must be absolutely free from sticking, and must open and close at practically the same pressure. It is a primary object of my invention to provide such a valve.

Other objects of my invention are:

To provide a liquid sealed valve which is self-leveling.

To provide a liquid sealed valve in which the gas passing through the valve does not continuously bubble through the sealing liquid.

To provide a relief valve which is economical to build and operate.

I attain these objects by the mechanism illustrated in the accompanying drawing in which:

Fig. 1 is a central cross section through my floating vacuum relief valve.

Fig. 2 is a central cross section through my floating pressure relief valve.

Fig. 3 is a section on the line 3—3 of Fig. 1.

Fig. 4 is a section on the line 4—4 of Fig. 3, being an enlarged detail of part of either Fig. 1 or Fig. 2.

Referring to Fig. 2 in which my present invention is applied to a tank as a pressure relief valve, the tank roof is indicated by numeral 5. Pipe 6 connects my relief valve to the tank and also forms a gas passage from the interior of the tank to the interior of the valve. A bell 7 incloses the upper end of this pipe. A basin 8 is non-leakably secured to pipe 6 and also contains bell 7. Basin 8 is partially filled with liquid to a depth sufficient to immerse the open end of the bell.

When the net upward thrust of the gas pressure exceeds the weight of the bell, it rises and permits the gas to escape under its rim, bubbling or blowing through the sealing liquid. This bubbling is undesirable and by providing the bell with the trough 11 it is practically eliminated. The extension of the rim 12 of the bell into the trough below the rim 13 determines the opening pressure. When such pressure is reached the gas pushes the liquid out of the trough, thus establishing a free passage for the continuance of the blow. When the gas pressure has dropped below that necessary to support the bell it sinks and trough 11 again fills with the sealing liquid.

The trough construction shown in Fig. 4 is advantageous. Here a second trough 14 is formed below the sealing trough, the purpose of this trough being to add weight to the bell as it emerges from the sealing liquid and also to prevent gas from discharging under trough 11. A passage 15 is provided to permit trough 14 to fill with liquid, the weight of this liquid becoming effective as the trough is withdrawn from the body of the sealing liquid. By adding weight to the bell in this manner the sealing trough is carried any desired distance above the liquid level which prevents the sealing liquid from splashing into the trough when gas is discharging.

The escaping gas can be prevented from leaking under trough 11 by several means. A simple manner of accomplishing this is to extend a continuous sheet below the trough in such manner that it remains submerged during the breaking of the seal in the trough 11.

It is highly desirable, in a liquid sealed valve, to prevent any entrainment and consequent loss of the sealing liquid. This liquid not only must be replaced but it might contaminate the contents of the tank. To make doubly sure that no droplets of the sealing liquid are carried out when the seal first breaks, a baffle, indicated at 16, is provided on which the liquid in the escaping gas impinges and collects to run back into basin 8.

A baffle 17 is secured over the upper end of pipe 6 which prevents the velocity of the escaping gas from affecting the balance of the bell. A fire screen 21 joins basin 8 to a cover 22.

The valve just described is for relieving pressures greater than atmospheric. Obviously by simply changing the tank connections to the top of this valve and opening the vent pipe to the atmosphere it will operate to relieve vacuum. Such an arrangement is shown in Fig. 1. Here pipe 18 communicates with the interior of the tank and with the interior of basin 8 outside the bell. The bell for the vacuum relief valve is identical with the bell used for pressure relief. The pipe 19 communicates with the atmosphere through the bottom of basin 8, and with the interior of the bell. When the pressure in the tank falls to a predetermined vacuum the bell is raised by atmospheric pressure and air enters the tank precisely as described for gas escaping. A fire screen 20 is provided over the atmosphere opening of pipe 19.

Just prior to opening, the bell is floating free on the gas within it and normal to the surface of the liquid in basin 8. Consequently the submergence of the bell is substantially equal on all sides and the opening pressure is unchanged by a slight departure from the horizontal.

Liquid sealed relief valves heretofore used allowed the escaping gas to bubble through the seal when the pressure or vacuum reached the desired limit, the sheet under which the gas escaped being rigidly fixed. Any departure of this edge from perfect level changed the depth to which it immersed in the sealing liquid, consequently changing the opening pressure.

Though I have described a preferred embodiment of my relief valve, I do not limit myself to the specific construction illustrated except as defined in the following claims.

I claim as my invention:

1. A relief valve comprising: a basin adapted to contain a liquid; a bell situated within said basin open end down, partially immersed in said liquid and free to float on the gas contained in the space between said bell and said liquid; a communicating passage from the interior of said bell above the highest level of said liquid to a point outside of said basin; a continuous trough secured to the rim of said bell in such manner that said rim enters said trough to form a liquid seal which is completely destroyed by the gas pressure in said bell when said bell lifts said trough out of said liquid, thus permitting gas to discharge from under said bell through said trough, and means for preventing said gas from escaping under said trough.

2. A device as and for the purpose set forth in claim 1, in which the last mentioned means comprises: a compartment continuously extending down from the trough and sufficiently long to remain partly immersed during the passage of the gas through the trough, and a passage through one wall substantially at the top of said compartment to admit liquid to the interior of said compartment.

In witness that I claim the foregoing I have hereunto subscribed my name this 4th day of May, 1928.

ERNEST W. ROTH.

CERTIFICATE OF CORRECTION.

Patent No. 1,727,785.             Granted September 10, 1929, to

ERNEST W. ROTH.

It is hereby certified that the above numbered patent was erroneously issued to "General Petroleum Corporation of California" as assignee, whereas said patent should have been issued to the inventor, said "Ernest W. Roth" as owner of the entire interest in said invention; and that the said Letters Patent should be read with this correction therein that the same may conform to the record of the case in the Patent Office.

Signed and sealed this 3rd day of December, A. D. 1929.

(Seal)                                                              M. J. Moore,
                                                           Acting Commissioner of Patents.